Oct. 30, 1956  R. E. FAY, JR  2,768,925
ARTICLE OF MANUFACTURE AND PROCESS OF MAKING SAME
Filed Dec. 21, 1954
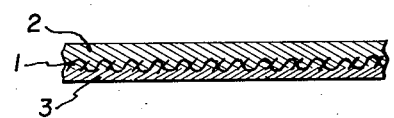
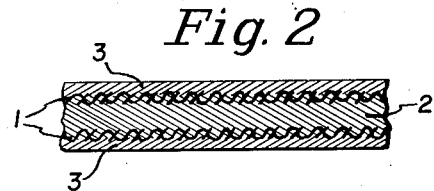
INVENTOR
ROBERT E. FAY, JR.
BY
AGENT

United States Patent Office 2,768,925
Patented Oct. 30, 1956

2,768,925

ARTICLE OF MANUFACTURE AND PROCESS OF MAKING SAME

Robert E. Fay, Jr., Highland Mills, N. Y., assignor to E. I. du Pont de Nemours and Company, Wilmington, Del., a corporation of Delaware Application December 21, 1954, Serial No. 476,670

7 Claims. (Cl. 154—128)

This invention relates to coated glass fabrics and laminates thereof.

Polytetrafluoroethylene is being widely used for its chemical inertness, dielectric strength and resistance to degradation at high temperatures. One of its important uses is in the coating of glass fabrics to provide chemical, electrical and heat insulation.

Glass fabrics have been coated by a plurality of dips into an aqueous suspension of polytetrafluoroethylene with drying and fusing of the polymer between each successive dip. Such a process provides a glass fabric having the interstices filled and surfaced on each side with polytetrafluoroethylene. For certain applications such as gaskets, diaphragms, bladders for jet fuel and the like where chemical and heat resistance as well as compressibility and suppleness are required, the polytetrafluoroethylene coated glass fabrics are not entirely satisfactory due to lack of compressibility and suppleness.

There are no known plasticizers or other softening agents for polytetrafluoroethylene which may be blended with the polytetrafluoroethylene coatings to achieve the suppleness required for certain applications.

The primary object of this invention is the provision of coated glass fabric which combines the chemical and heat resistance of polytetrafluoroethylene coatings with the compressibility and suppleness of silicone rubber coatings.

The objective of this invention is accomplished by applying a silicone composition to one side of a woven glass fabric to fill the interstices thereof and provide a surface coating on the side from which the composition is applied, and subsequently applying a polytetrafluoroethylene coating to the other side of the silicone filled glass fabric. It is important that the interstices of the glass fabric be filled with silicone polymer before the polytetrafluoroethylene coating is applied.

Figure 1 of the drawing is an enlarged cross-section showing the glass fabric 1 having the interstices filled and one side coated with a silicone composition 2 and the other side coated with a polytetrafluoroethylene composition 3. Figure 2 is an enlarged cross-section of a laminate formed from two plies of the material illustrated in Figure 1, in which the silicone composition 2 forms the middle layer.

The following specific examples are given by way of illustration and not limitation:

Example I

A woven glass fabric identified as ECC–116 and having the following specifications:

| | |
|---|---|
| Width—inches | 38 |
| Thickness—mils | 4 |
| Avg. wt. per sq. yd.—oz. | 3.2 |
| Weave | Plain |
| Yarn—warp and fill | 450½ | was filled from one side with two doctor knife applications of a 33% solution of a silicone rubber (polydimethyl siloxane) in xylene with forced drying between each coat. Sufficient of the base coat was applied to deposit 1.5 dry ounces per square yard. The treated fabric was next cured 5 minutes at 450° F. The silicone treated fabric was further coated by calendering 10.5 ounces per square yard of the following composition onto the same side from which the filling was applied:

| | Parts by wt. |
|---|---|
| Silicone rubber (polydimethyl siloxane) | 97.1 |
| Ferric oxide pigment | 2.9 |
| | 100.0 |

The calender coating was cured at 300° F. for 5 minutes under a pressure of 50 p. s. i., followed by a two hour air cure at 450° F.

The other (uncoated) side of the glass fabric was coated with three doctor knife applications of the following coating composition:

| | Parts by wt. | |
|---|---|---|
| Aqueous dispersion of polytetrafluoroethylene: | | |
|   Polytetrafluoroethylene | 44.5 | |
|   Octyl phenyl polyglycol ether | 2.7 | 99.0 |
|   Water | 51.8 | |
| Ammonium algniate | | 1.0 |
| | | 100.0 |

The above composition had the consistency of mayonnaise. Sufficient of the above composition was applied to the glass fabric to deposit 3.0 ounces per square yard of non-volatile components. The polytetrafluoroethylene coated side of the coated fabric was passed near a source of radiant heat to at least partially fuse the polytetrafluoroethylene coating. In order to completely fuse the polytetrafluoroethylene it must be heated to at least 621° F. At the fusion temperature all the ingredients of the polytetrafluoroethylene coating other than polytetrafluoroethylene are either volatilized or carbonized.

The double coated glass fabric had the following weight specifications:

| | |
|---|---|
| Weight of glass fabric—oz./sq. yd. | 3.2 |
| Weight of polytetrafluoroethylene coating—oz./sq. yd. | 3.0 |
| Weight of silicone coating—oz./sq. yd. | 11.5 |
| Total weight—oz./sq. yd. | 18.2 |

The double coated glass fabric had the suppleness and resiliency comparable to that of a glass fabric coated on each side with a similar amount of a conventional rubber coating. It was ideally suited for use as a gasket material for a metal to metal seal.

Example II

A flexible two layer laminate, as illustrated in Figure 2 of the drawing, was prepared from the glass fabric filled and coated on one side with a silicone composition and coated on the other side with a polytetrafluoroethylene composition, as described in Example I, by superposing two plies in such a manner that the silicone coating of one ply contacts the silicone coating of the other ply and then the assembly was subjected to a pressure of about 50 p. s. i. for a period of about 5 minutes at about 330° F. The laminated assembly represents two plies of glass fabric with an intermediate bonding layer of silicone rubber and polytetrafluoroethylene coating on the outer surface of each fabric ply. The laminated assembly with the intermediate silicone layer and polytetrafluoroethylene outer surfaces has essentially the chemical and heat resistant properties of polytetrafluoroethylene but is considerably more flexible and compressible than a two layer laminate made from glass fabric coated on each side with polytetrafluoroethylene. Such a product is ideally suited for a gasket material for a metal to metal seal.

*Example III*

The glass fabric filled and coated on one side with the silicone rubber, as described in Example I, may be coated on the other side with the following polytetrafluoroethylene composition by means of a doctor knife:

|  | Parts by wt. |
|---|---|
| Aqueous dispersion of polytetrafluoroethylene: |  |
|    Polytetrafluoroethylene | 48.0 ⎫ |
|    Octyl phenyl polyglycol ether | 4.8 ⎬ 80.0 |
|    Water | 27.2 ⎭ |
| Isopropyl alcohol | 20.0 |
|  | 100.0 |

The above composition is agitated for a few minutes to form a gel suitable for doctor knife application. After the above composition is applied to the side of the glass fabric opposite the silicone coating it is subjected to a temperature of at least 621° F. The product prepared according to this example is the full equivalent to that prepared in accordance with the procedure of Example I.

The silicone coatings applied to the one side of the glass fabric opposite the polytetrafluoroethylene coating are based on solid polysiloxanes and are commonly referred to as "silicone rubbers" and are represented by the following empirical formula:

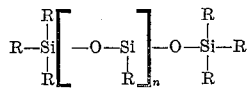

in which the various "R's" represent monovalent alkyl hydrocarbon radicals and/or phenyl radicals and "$n$" is a whole number greater than 1. Any of the silicone rubbers represented by the above empirical formula may be substituted in any one of the foregoing specific examples on a pound for pound basis.

The products of this invention combine the flexibility and compressibility of silicone rubber coatings with the chemical and heat resistance of polytetrafluoroethylene coatings. The coated single ply glass fabric as well as the two ply laminate are particularly useful in the aircraft industry for gaskets and diaphragms which must remain flexible at minus 100° F. occasionally encountered at 40,000 feet. They must also resist degradation when exposed to temperatures as high as 450° F. Due to the superior oil resistance of polytetrafluoroethylene at 350° F. and the compressibility of the silicone layer the two layer laminates are particularly adapted to seal fluid transmission units in automobiles.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The invention claimed is:

1. A glass fabric having the interstices filled with a cured silicone rubber compound, a surface coating of cured silicone rubber compound on one side and a surface coating of polytetrafluoroethylene on the other side.

2. The product of claim 1 in which the polytetrafluoroethylene coating has been heated to at least 621° F.

3. The product of claim 1 in which the silicone rubber is polydimethyl siloxane.

4. The process of coating a glass fabric which comprises filling the interstices thereof by applying to one side of a glass fabric a solution of a silicone rubber composition in a volatile organic liquid, heating to evaporate the volatile liquid, further coating the same side of the glass fabric with a silicone rubber composition, heating to cure the second mentioned coating, applying to the other side of said glass fabric an aqueous dispersion of polytetrafluoroethylene, heating to evaporate the water and further heating to bring about coalescence of the polytetrafluoroethylene.

5. The process of claim 4 in which the polytetrafluoroethylene coating is heated to at least 621° F.

6. The process of claim 4 in which the silicone rubber is polydimethyl siloxane.

7. The process of coating a glass fabric which comprises filling the interstices thereof by applying to one side of a glass fabric a solution of a silicone rubber composition in a volatile organic liquid, heating to evaporate the volatile liquid, further coating the same side of the glass fabric with a silicone rubber composition, heating to cure the second mentioned coating, applying to the other side of said glass fabric an aqueous dispersion of polytetrafluoroethylene, heating to evaporate the water, and laminating two plies of the above described coated fabric by placing the silicone rubber coating of one ply in contact with the silicone rubber coating of the other ply, subjecting the two plies to sufficient heat and pressure to cause the two plies to become welded together.

References Cited in the file of this patent
UNITED STATES PATENTS

| 1,455,744 | Diamond | May 15, 1923 |
| 1,900,904 | Berger | Mar. 14, 1933 |
| 2,492,498 | Pedersen | Dec. 27, 1949 |
| 2,525,070 | Greenwald | Oct. 10, 1950 |
| 2,681,527 | Sundt | June 22, 1954 |